United States Patent
Fix et al.

[11] Patent Number: 6,160,655
[45] Date of Patent: Dec. 12, 2000

[54] UNITS WITH VARIABLE OPTICAL/ENERGETIC PROPERTIES

[75] Inventors: Renaud Fix, Paris; Xueyun Lin, Fontenay aux Roses, both of France

[73] Assignee: Saint-Gobain Vitrage, Courbevoie, France

[21] Appl. No.: 08/890,023

[22] Filed: Jul. 10, 1997

[30] Foreign Application Priority Data

Jul. 10, 1996 [FR] France .................................. 96/08591

[51] Int. Cl.⁷ .......................... G02F 1/1333; G02F 1/15; G02F 1/157

[52] U.S. Cl. .......................... 359/265; 359/274; 359/275; 349/16; 52/786.11; 52/786.12

[58] Field of Search ...................................... 359/265, 275, 359/253, 274; 349/16; 52/204.5, 204.59, 786.11, 786.12

[56] References Cited

U.S. PATENT DOCUMENTS

| | | | |
|---|---|---|---|
| 4,435,047 | 3/1984 | Fergason | 428/1 |
| 4,806,922 | 2/1989 | McLaughlin et al. | 340/784 |
| 5,206,747 | 4/1993 | Wiley et al. | 359/51 |
| 5,239,406 | 8/1993 | Lynam | 359/275 |
| 5,352,504 | 10/1994 | Boulanger et al. | 359/275 |
| 5,379,146 | 1/1995 | Defendi | 359/275 |
| 5,416,617 | 5/1995 | Loiseaux et al. | 359/265 |
| 5,500,760 | 3/1996 | Varaprasad et al. | 359/275 |
| 5,657,149 | 8/1997 | Buffat et al. | 359/275 |
| 5,663,829 | 9/1997 | Lefrou et al. | 359/275 |
| 5,666,771 | 9/1997 | Macquart et al. | 359/275 |
| 5,694,144 | 12/1997 | Lefrou et al. | 359/275 |
| 5,725,809 | 3/1998 | Varaprasad et al. | 359/275 |
| 5,793,518 | 8/1998 | Lefrou et al. | 359/275 |

FOREIGN PATENT DOCUMENTS 2-120828  5/1990  Japan .

*Primary Examiner*—Georgia Epps
*Assistant Examiner*—Margaret Burke
*Attorney, Agent, or Firm*—Oblon, Spivak, McClelland, Maier & Neustadt, P.C.

[57] ABSTRACT

The invention relates to a unit with variable optical properties, which combines at least one system with variable light transmission/absorption, especially of the electrochromic or viologen type, with at least one system with variable light diffusion, especially of the optical valve type or with liquid crystals. The systems are electrically control-driven in order to modulate in a decorrelated manner the light transmission level and the light diffusion level of the unit.

23 Claims, 3 Drawing Sheets

UNITS WITH VARIABLE OPTICAL/ENERGETIC PROPERTIES

BACKGROUND OF THE INVENTION

1. Field of the Invention

The present invention relates to units, especially glazing, with variable optical/energetic properties. It relates more precisely to glazing some of whose characteristics can be modified under the effect of an electrical input, for example the light diffusion or the transmission of electromagnetic radiation at some wavelengths, especially in the infrared or in the visible.

2. Discussion of the Background

An increasingly keen demand exists, in fact, for so-called "intelligent" glazing, that is to say glazing whose properties can be modulated at will, especially in order to take into account various parameters that are capable of changing progressively. Thus, it may be found highly advantageous to be able to control sunlight input through glazing fitted externally in buildings or vehicles of the motor vehicle or train type, in order to prevent excessive heating of the rooms or compartments in the event of strong sunshine. Similarly, it may be useful to be able to control the degree of vision through glazing, especially to reduce it or even to prevent it completely for a certain time, for example in the case of glazing employed as internal partitions between two rooms, in a building, or between two compartments, in a means of locomotion of the train or aircraft type. Many other applications also exist for such glazing: it is possible, for example, to mention vehicle rear-view mirrors which, by becoming darker in case of need, can prevent dazzling of the driver, or road or urban sign boards showing messages or designs only intermittently, so as better to attract attention. Transparent glazing units can also be mentioned which can have a sufficiently diffusing state to be employed as projection screens.

The interest which such glazing arouses justifies the fact that many systems have already been studied. Thus, known systems which make it possible to modulate the light transmission or absorption of glazing are especially so-called viologen systems, as described in U.S. Pat. No. 5,239,406 or in patent EP-A-0 612 826.

For the same purpose there are also so-called electrochromic systems, the principle of operation of which is briefly recalled: in a known manner, these comprise a layer of an electrochromic material capable of inserting cations and electrons reversibly and simultaneously and whose oxidation states corresponding to the inserted and deinserted states are of different colour, one of the states exhibiting a higher light transmission than the other. The insertion or deinsertion reaction is control-driven by a suitable electrical input with the aid of a current generator or a voltage generator. The electrochromic material, usually tungsten oxide-based, must thus be placed in contact with a source of electrons, such as a transparent electrically conductive layer and with a source of cations, such as an ion-conductive electrolyte.

Furthermore it is known that, in order to ensure at least a hundred switchovers or so, the layer of electrochromic material must be used in combination with a counterelectrode, also capable of inserting cations reversibly, symmetrically in relation to the layer of electrochromic material, such that, macroscopically, the electrolyte looks like a simple medium for the cations.

The counterelectrode must consist either of a layer of neutral colour, or at least transparent or weakly coloured when the electrochromic layer is in the faded state. Since tungsten oxide is a cathodic electrochromic material, that is to say that its coloured state corresponds to the most reduced state, an anodic electrochromic material such as nickel oxide or iridium oxide is generally employed for the counterelectrode. It has also been proposed to employ a material which is optically neutral in the oxidation states concerned, like, for example, cerium oxide or organic materials like electron-conductive polymers (polyaniline etc.) or Prussian blue.

The description of such systems will be found, for example, in European patents EP-0 338 876, EP-0 408 427, EP-0 575 207 and EP-0 628 849.

At present these systems can be classified into two categories, depending on the type of electrolyte which they employ:

either the electrolyte is in the form of a polymer or of a gel, for example a proton-conductive polymer such as those described in European patents EP-0 253 713 and EP-0 670 346, or a polymer conducting lithium ions, such as those described in patents EP-0 382 623, EP-0 518 754 or EP-0 532 408, or the electrolyte is an inorganic layer, ion-conductive but electronically insulating; these are then referred to as "all solid" electrochromic systems. For the description of an "all solid" electrochromic system, reference may be made to the French patent application filed on Mar. 27, 1996 under the filing number FR-96/03799.

The viologen or electrochomic systems deposited or associated with transparent substrates constitute glazing whose light absorption and transmission (as well as energy transmission) can vary within given ranges, ranges that are determined especially by the choice of the electrochromic materials employed and/or by the choice of their thickness. However, this glazing exhibits some limits which are intrinsic to it: thus, even though some configurations allow it to attain very low light transmission values in the coloured state, for example of the order of 1% down to 0.1%, it cannot ensure complete obscuring, in other words, its light transmission level is, despite everything, still too high to prevent the identification of an object or of a person through the glazing by an observer placed on the other side of the said glazing, above all if there is a stronger light source on the side of the object, for example in the case of a room lit at night.

To obtain this effect the electrochromic glazing alone cannot therefore suffice, and it will be necessary to add to it an external unit which, depending on requirements, will either make vision blurred through the glazing, like a net curtain, or will simply prevent vision completely by opacifying the latter, this being the case of a unit of the shutter type. However, these units require maintenance, age badly, and have properties which cannot be modulated.

Another type of "intelligent" glazing consists of what is referred to by the term of optical valve: this is a film including a generally crosslinked polymer matrix in which are dispersed microdroplets containing particles which exhibit the property of adopting a preferred direction under the action of an electrical or magnetic field.

The film exhibits variable optical properties, especially as a function of the potential applied to the terminals of the conductive layers placed on either side of the film and of the concentration and nature of the orientable particles.

Thus, patent WO-93/09460 discloses an optical valve based on a film including a crosslinkable polyorganosilane matrix and inorganic or organic orientable particles, more particularly particles that absorb light, such as polyiodide particles. When a voltage is applied to the film, the particles intercept light much less than when it is without voltage.

A glazing whose operating principle is similar is also known under the name of liquid-crystal glazing. It is based on the use of a film placed between two conductive layers and based on a polymeric material in which are dispersed droplets of liquid crystals, especially nematic with positive dielectric anisotropy. When a voltage is applied to the film, the liquid crystals are oriented along a preferred axis, and this permits vision. With no voltage, in the absence of crystal alignment, the film becomes diffusing and prevents vision.

Examples of such films are described especially in European patent EP-0 238 164 and U.S. Pat. Nos. 4,435,047, 4,806,922 and 4,732,456. Film of this type, once laminated and incorporated between two glass substrates, is marketed by Saint-Gobain Vitrage under the trade name "Priva-lite".

It is possible, in fact, to employ any devices containing liquid crystals known under the names of "NCAP" (Nematic Curvilinearly Aligned Phases) or "PDLC" (Polymer Dispersed Liquid Crystal).

It is also possible to employ, for example, polymers containing cholesterol liquid crystals, like those described in patent WO-92/19695.

This glazing itself also has its limitations: thus, while actually making it possible to obtain a variable light diffusion, it does not make it possible to darken significantly the room or the compartment in which it can be fitted.

In order also to successfully modulate light transmission, there is a solution which consists in adding dyes, of the dichroic dye type, to the film. However, two disadvantages remain: on the one hand, with these dyes the film exhibits some instability, very particularly to ultraviolet radiation, and these dyes are soluble not only in the droplets of liquid crystals, but also partially in the polymer; this restricts the possibilities of modulating the light transmission of the system. Furthermore, the changes in light diffusion and transmission are closely dependent on one another: it is possible to obtain only high light transmission/nondiffusing state or low light transmission/diffusing state "pairs".

SUMMARY OF THE INVENTION

The objective of the invention is therefore to bridge the gaps in the various "intelligent" glazing systems existing at present and very particularly to develop a glazing several characteristics of which, very particularly optical ones, can be adjusted with greater flexibility.

The subject-matter of the invention is a unit with variable optical properties which associates at least one system with variable light transmission/absorption, especially of the electrochromic or viologen type, with at least one system with variable light diffusion, especially of the optical valve type or with liquid crystals. These two systems are electrically control-driven in order to modulate, in a decorrelated manner, the light transmission level and the light diffusion level of the said unit. The system with variable light diffusion preferably functions so as to be more diffusing when it is not supplied with electricity than when it is electrically powered and especially is in its maximum diffusion state when it is not powered.

The unit according to the invention, being especially in the form of a glazing, opens new fields of application for so-called "intelligent" glazing. In fact, it allows the choices of two different optical characteristics, independently of one another, it being known that each of the two systems which it comprises has its electrical supply which can be "steered" separately or together.

Any viologen or electrochromic system can be suitable, especially of the type of those described in the abovementioned patents EP-0 338 876, EP-0 408 427, EP-0 575 203 and EP-0 628 849. It is preferably in the form of a stack of functional layers comprising successively a preferably transparent electrically conductive layer, a so-called cathodic electrochromic layer capable of reversibly inserting cations such as $H^+$, $Li^+$, $Na^+$ or $Ag^+$, an electrolyte layer, optionally a counterelectrode in the form of a so-called anodic second electrochromic layer which is also capable of reversibly inserting cations and, finally, a second electrically conductive layer.

Insofar as the nature of the electrically conductive layers of the device is concerned, there are two possible alternative forms: is it possible to use materials based on doped metal oxide, such as fluoride-doped tin oxide $SnO_2$:F or tin-doped indium oxide ITO. It is also possible to employ layers made of metal or metal alloy, for example made from gold Au, silver Ag or aluminium Al. Since the device generally has two electrically conductive layers, these can be either both metallic, or both based on doped oxide, or one metal-based and the other doped oxide-based.

To form the layer of cathodic electrochromic material it is possible to choose a material or a mixture of materials chosen from the group including tungsten oxide $WO_3$, molybdenum oxide $MoO_3$, vanadium oxide $V_2O_5$, niobium oxide $Nb_2O_5$, titanium oxide $TiO_2$, a "cermet" material (a combination of metal and ceramic material, especially in the form of metallic particles in a ceramic matrix) such as $WO_3$/Au or $WO_3$/Ag, and a mixture of tungsten and rhenium oxides $WO_3$/$ReO_3$. These materials are suitable especially in the case of reversible insertion of lithium ions. In the case where the device functions by reversible proton insertion, the same materials can be employed, but this time hydrated.

To form the layer of anodic electrochromic material a material can be chosen which corresponds to the formula $M_xA_yU_z$, where M is a transition metal, A the ion employed for the reversible insertion, for example an alkali metal or a proton, and u a chalcogen such as oxygen or sulphur.

This may be, especially in the case of an insertion of $H^+$ proton ions, a compound or a mixture of compounds belonging to the group including $IrO_xH_y$, $IrO_xH_yN_z$, $NiO_x$, $NiO_xH_y$, $NiO_xH_yN_z$, $RhO_x$, $CoO_x$, and $MnO_x$. In the case of a reversible insertion of $Li^+$ lithium ions, the choice made is preferably a compound or a mixture of compounds belonging to the group including $LiNiO_x$, $LiMn_2O_4$, $IrO_x$, $Li_xIrO_y$, $NiO_x$, $CeO_x$, $TiO_x$, $Ceo_x$—$TiO_x$, $RhO_x$, $CoO_x$, $CrO_x$, and $MnO_x$.

Insofar as the choice of the electrolyte material is concerned, there are, in fact, two types of this, as already mentioned above.

It may be a layer of aqueous liquid, such as water with the addition of sulphuric or phosphoric acid in the case of a reversible insertion of protons, or a layer of anhydrous liquid such as propylene carbonate containing a lithium salt in the case of a reversible insertion of lithium ions. It may also be a layer of gel or of polymer, especially of proton-conductive polymers of the type of solid solution of polyoxyethylene and of phosphoric acid POE—$H_3PO_4$ (in this case the polymer also constitutes an electron insulator) or else based on a polymer obtained by copolymerization of three precursors including two types of grafted trialkoxysilanes and a plasticizer containing at least one urea group. The polymer conducting lithium ions which is chosen may be an ionomer obtained by partial neutralization of polyacrylic acid or a polymer based on branched polyethyleneimine and on a lithium salt. For more details on the nature and the synthesis of such polymeric products reference will advantageously be made to the patents cited in the preamble of the present application.

It may, however, also be an electrolyte in the form of a solid material, based especially on metal oxide. According to a preferred alternative form of the invention, the system is chosen such that it contains only layers of solid material. In the context of the invention "solid material" is intended to mean any material which has the mechanical behaviour of a solid, in particular any essentially inorganic or organic material or any hybrid material, that is to say partially inorganic and partially organic, like materials that can be obtained by sol-gel deposition from organo-inorganic precursors. This then gives a so-called "all solid" system configuration which offers a clear advantage in terms of ease of manufacture. In fact, when the system contains an electrolyte in polymer form which does not have the mechanical behaviour of a solid, for example, the manufacturer is constrained, in fact, to producing, in parallel, two "half-cells", each consisting of a carrier substrate coated with a first electrically conductive layer and then with a second electrochemically active layer, these two half-cells being subsequently assembled by inserting the electrolyte between them. With an "all solid" configuration the manufacture is simplified. since both the layers of the system can be deposited, one after the other, on a single carrier substrate. The electrochromic system/carrier substrate combination can thus be made lighter, since a single carrier substrate instead of, usually, two can then suffice.

This lightening is all the more valuable here, since the unit according to the invention also comprises a second active system, that with variable light diffusion, and since it is therefore important to limit its bulk and weight.

In addition, regardless of whether the electrolyte is "solid" or not, it may include a layer made of an ionically conductive material capable of reversibly inserting the ions, but the oxidation state of which is maintained essentially constant. It may be especially a material with electrochromic properties, as described in the abovementioned patent FR-96/03799.

The system with variable light transmission/absorption of the unit according to the invention can therefore be found placed either between two rigid substrates or on a single rigid substrate, more particularly in the case of an "all solid" system. Rigid carrier substrates are preferably made of glass, acrylic polymer, polycarbonate or some polyurethanes.

The choice of the system with variable light diffusion to be incorporated into the unit according to the invention falls advantageously on so-called optical valve systems or those with liquid crystals which were described above. In the case of systems with liquid crystals the nature of the polymeric matrix and of the crystals is chosen judiciously so that the ordinary index of the crystals $n_o$ is equal to the index of the polymer $n_p$.

Where the optical valves or systems with liquid crystals are concerned, both the systems are in the form of a film of "active" polymer, the polymer containing droplets of suspension of dichroic particles in the case of optical valves and droplets containing liquid crystals in the case of systems with liquid crystals. In order to ensure its electricity supply, it is usually placed between two electrically conductive layers, in particular transparent and of the type of those employed for the electrochromic systems described above.

In addition, the film with its two conductive layers is usually provided on at least one of its faces, and preferably on each of these, with a carrier substrate. The latter is generally transparent. It can be chosen to be rigid or semirigid, for example made of glass, acrylic polymer of the polymethyl methacrylate PMMA type or of polycarbonate PC. It can also be flexible, especially made of polyethylene terephthalate PET or based on some flexible polycarbonates. It is thus possible to have a structure of the PET/ITO/"active" polymer/ITO/PET type, which is in the form of a flexible sheet that can be easily handled. This combination ("active" polymer+electrically conductive layers+at least one carrier substrate) can next be laminated with at least one transparent rigid substrate of the glass type with the aid of at least one layer of organic bonding polymer of the polyvinylbutyral PVB or ethylene/vinyl acetate EVA type or some polyurethanes PU.

The mounting of the two systems, on the one hand that with variable light transmission/absorption, on the other hand that with variable light diffusion, into a common unit can be carried out in various ways.

Without any limitation being implied, the invention proposes four alternative forms, each having its advantages as a function of the intended application:

According to a first alternative form, both systems are maintained integrally joined one to the other, but are at a distance from one another or, at the very least, mounted so that they do not completely adhere to one another. It is thus possible to envisage one of the systems being stationary, permanently maintained in a given position, for example in a building or a vehicle, to which system the second system is adjoined, with the aid of optionally removable securing means of the fixing clips or pressure-adhesive means type, like adhesive based on acrylate derivatives. Means are provided for the electrical connections of both systems to be ensured, once both systems are combined. This alternative form has the advantage of the ability to replace one of the systems with another new one rapidly in the case of accidental damage, without having to change/disassemble the whole of the unit.

According to a second alternative form, the unit according to the invention comprises a rigid substrate of the glass substrate type. On one of its faces it is provided with an all solids electrochromic system. On the same face, superposed on the electrochromic system, or on the opposite face, it is provided with the system with liquid crystals. The superposition can also be made in the other direction, with firstly the system with liquid crystals and then the electrochromic system on the same face. The advantage of this alternative form lies in the compactness of the unit thus produced: only one substrate is required.

According to a third alternative form, the unit according to the invention comprises two rigid substrates, of the glass substrate type. A first embodiment consists in placing the two systems between the two substrates. A second method consists in placing one of the two systems between the two substrates and the second on the external face of one of the substrates. One then has preferably either the electrochromic system between the two substrates and the system with liquid crystals outside, or the reverse. In the latter case the most suitable electrochromic system is the "all solid" one. This third alternative form is advantageous in the sense that it offers the possibility of employing an electrochromic system which either is "all solid", or comprises layers which are not "solid".

According to a fourth alternative form, the unit according to the invention comprises three rigid substrates, of glass substrate type. In this case one of the systems is placed between the first and the second substrate and the other between the second and the third substrate. The advantage which this alternative form offers lies in the robustness obtained: the functional layers of the two systems are fully protected mechanically.

In the case where the system with variable light diffusion is a system with an optical valve or with liquid crystals, which it is intended to make adhere to a rigid substrate of glass type or to the variable-transmission system of the electrochromic type already deposited on the rigid substrate, an adhesive means may be provided between the two parts to be assembled, particularly an adhesive or a pressure-sensitive adhesive, of the acrylate derivative type, or else a layer of organic polymer for assembly of the PVB, EVA or PU type.

Furthermore, the unit according to the invention, described above, can be advantageously fitted as laminated glazing and/or multiple glazing with intervening gas sheet (s).

We now come to the applications of the unit according to the invention: the unit can be employed especially as glazing for building construction, for the motor vehicle, or for any industrial or public transport vehicles, as railway glazing or aircraft glazing.

It can be employed as outward-facing glazing of a room or of a compartment. In this case the operation of the variable-transmission system can be modulated, especially to limit the energy input due to solar radiation or to screen slightly the light entering inside. In the case of an electrochromic system it will be proportionally more coloured as it is desired to limit the quantity of light and/or-of heat entering the compartment or the room: the visual and thermal comfort is adjusted. The functioning of the variable light diffusion system is then modulated in parallel, in a complementary manner, in order to make it possible, for example, to let the glazing be transparent or, on the contrary, to make it completely diffusing. The light diffusion level is generally measured using turbidity, which is defined as the ratio of the diffused transmission to the total transmission at 560 nm.

The unit according to the invention can thus at will exhibit any value of light transmission $T_L$ and any turbidity value within the given ranges.

By choosing, for example, a high $T_L$ and a high turbidity, the glazing can acquire a "concealment" function which enables privacy to be protected in a room or a compartment. This can make it possible to avoid having to use net curtains.

By choosing a low $T_L$ combined with a high turbidity, the glazing can acquire the additional functionality of a window shutter. In fact, at night, such glazing is found to be highly advantageous when fitted to rooms or compartments which are lit: passers-by outside can no longer see through inside the said rooms or compartments, which is practical both in the context of glazing for buildings and of glazing employed for sleeper-train compartments in particular.

The unit according to the invention can also be employed as glazing of an internal partition or of a glass door. In this case, too, darkening combined with a sufficient level of turbidity makes it possible to ensure obscuring/privacy between rooms or between compartments.

It is important to emphasize that neither of the two systems, taken separately, would make it possible to obtain such results and such flexibility in. operation. Only their combined use makes it possible, in fact, in a complementary manner, to exceed the limits which are inherent in each of them. The unit according to the invention can, thus, for example, have a light transmission which it is possible to vary between 1 and 60%, especially between 5 and 50% or between 0.01 and 20% in relation to the illuminant $D_{65}$ and a turbidity level between 1 and 100%, especially between 6 and 95 or 99%, independently.

The unit according to the invention can also be advantageously employed as so-called "sun-break" glazing in building construction, especially for glazing intended to be fitted inclined at an angle in relation to the vertical, or even to be fitted in a horizontal position. In the context of the invention "sun-break" is intended to mean the property of preventing the formation of "sunspots" in a room fitted with highly inclined glazing. The unit according to the invention either completely replaces the glazing or it can merely be appended to it.

The unit according to the invention also has a completely different application: it can very advantageously form part of a screen for back projection, and very particularly for a back projector operating in transmission. The applications of back-projection screens operating in transmission are numerous. Display windows, advertising boards or information boards may be mentioned in particular. The configuration which is preferably to be found is that where the projector is placed on one side of the unit and the observer on the opposite side. In the unit serving as a screen the variable-diffusion system is then placed preferably on the side of the projector and the variable transmission/absorption system on the side of the observer. The light beam emitted by the projector thus passes through the screen and the variable transmission/absorption system will make it possible to absorb a portion of the transmitted beam once, but the interfering light reflected in diffuse manner on the screen twice. This interfering light originates from the lighting on the side of the observer.

Taken overall, the variable transmission/absorption system and variable-diffusion system combination makes it possible to improve significantly the quality of the projected image, especially by adjusting the level of absorption of the screen as a function, for example, of the surrounding lighting. It is thus possible to preserve the quality and the visibility of the projected image even when the projection takes place in full daylight. This improvement in visibility is generally measured qualitatively by measuring the contrast C which, as is known, is defined by the following relationship:

$$C=(L_{max}+R_l)/(L_{min}+R_L)$$

where $L_{min}$ is the minimum luminance, with reference to a black point, and $L_{max}$ the maximum luminance, with reference to a white point, $R_L$ the surrounding light reflected by the screen, including the diffuse reflection by the diffusing component of the screen. From this definition of the contrast C it is understood that the more the value of $R_L$ can be decreased, the better will be the contrast, the unit according to the invention making it possible precisely to modulate the diffuse part of $R_L$ and thus to adjust the contrast as well as possible, without having to darken the premises where the projection takes place.

In the case of a back projection working this time by reflection, that is to say when both the observer and the projector are situated on the same side of the screen, the advantage of employing a unit according to the invention as a screen exists, but is smaller than in the case of a back projection working by transmission: the variable transmission/absorption system makes it possible to attenuate the level of direct light transmission passing through the screen when the latter is placed before a conventional window frame by darkening the premises where the projection takes place. In this exemplary case, in order that the images projected on the screen by reflection should be visible even in full daylight, it is preferable to resort to a variable transmission/absorption system of the electrochromic type allowing very low light transmission values to be attained, for example lower than 0.1%, to obtain a real hiding effect with regard to the external light.

The invention also relates to the process of operating the unit according to the invention, which consists in controlling jointly the electricity supply to the variable-transmission system and the electricity supply to the variable-diffusion system, in order to obtain the desired $T_L$ and light diffusion levels either by manual control or by automation.

A voltage generator or a current generator can be employed for supplying electricity to a system with variable $T_L$ of the electrochromic type. For more details reference may be made, for example, to patents EP-408 427, EP-475 847, EP-568 457, EP-683 419 or FR-2 728 696.

For supplying electricity to a variable-diffusion system of the type with liquid crystals, in a known manner, a suitable voltage generator is sufficient, for example a 110 V/50 Hz alternating sinusoidal signal.

Either or both of the two systems can therefore be controlled electrically using an automated control with the aid of electronic and/or data-processing means. Either the control is carried out by following a preestablished instruction or it is servo-controlled by the measurement of a parameter given by suitable sensors. The parameters can thus be the temperature, the lighting, the light transmission or the solar flux. In the case of an application of the unit according to the invention as a back projection screen, the ambient lighting can thus be this parameter concerned. If it is employed as external glazing of a building or car, the temperature, the $T_L$ level or the measurement of the solar flux passing through the unit are more concerned.

BRIEF DESCRIPTION OF THE FIGURES

Other details and advantageous characteristics will emerge from the description, given below, of nonlimiting examples, with reference to the attached drawings, which show.

DETAILED DESCRIPTION OF THE INVENTION

Figure 1:
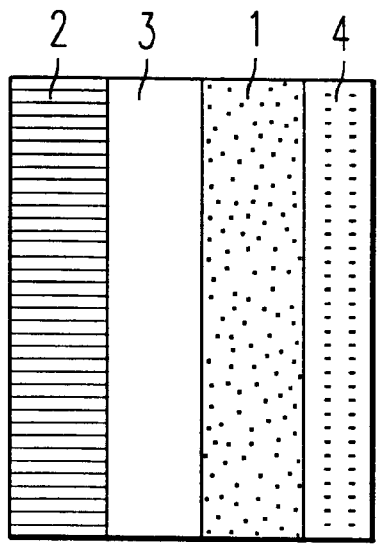
FIGS. 1 and 2: two illustrations of units according to the invention employing a single rigid substrate.

FIGS. 1 to 4 are extremely diagrammatic and do not conform to the proportions of the various units shown, this being to make them easier to read. In particular, all the electrical connections, which are known per se, are not shown.

The rigid substrates employed for all the examples which follow are substrates made of clear 4 mm silica-soda-lime glass. (They could also be tinted in the bulk and have different thicknesses, for example of between 3 and 6 mm).

In all the examples which follow, the unit according to the invention uses an electrochromic system in combination with a system with liquid crystals. The system with liquid crystals employed is of the type of those described in patents WO-90/03593, U.S. Pat. No. 5,206,747 and EP-0 409 442.

It is made up of a film of transparent polymer in which microdrops of a nematic liquid crystal have previously been dispersed, which constitutes the emulsion of liquid crystals of a total thickness of 25 $\mu$m, and which is sandwiched between two sheets of polyethylene terephthalate (PET) of 175 $\mu$m thickness, each coated with a transparent conductive layer made of ITO of resistivity 100 ohms per square. The structure of the system with liquid crystals is therefore the following: PET/ITO/liquid-crystal emulsion/ITO/PET.

The liquid crystal molecules have several refractive indices: two "ordinary" indices $n_o$ which are equal in the two directions perpendicular to their axes of symmetry and an "extraordinary" index $n_e$ in the axis of symmetry. The polymer is chosen so as to have a refractive index very close to the ordinary index $n_o$. In the absence of voltage, the axes of the various drops are not mutually correlated. At each polymer-drop interface, therefore, the incident light undergoes a high refraction due to the difference in index between the polymer and the drop whose orientation is random. The light is therefore diffused in all directions. Under maximum voltage (110 volts) the optical axes of the various drops are aligned in the direction of the electrical field, that is perpendicularly to the glazing. The incident light, essentially normal to the glazing, now encounters only a medium of continuous index $n_p$ equal to $n_o$ and is no longer diffused. The intermediate turbidity states are accessible with voltage values of especially between 0 and 110 volts.

The type of electrochromic system employed, for its part, differs according to the type of configuration of the unit, which will be made more explicit when each of the figures is described, but here it functions in all cases by reversible insertion of $H^+$ protons.

Either what is involved is an electrochromic system referred to below by the term of system "A", which is an "all solid" system, and in which the stacking of functional layers is the following:

an electrically conductive layer made of $SnO_2$:F, of 300 nm, a layer of cathodic electrochromic material made of tungsten oxide, of 380 nm, a twin-layer electrolyte made up of a layer of hydrated tantalum oxide $Ta_2O_5 \cdot nH_2O$, of 18 nm, and a layer of hydrated tungsten oxide $WO_3 \cdot nH_2O$, of 200 nm, a layer of anodic electrochromic material based on hydrated iridium oxide $H_xIrO_y$, of 45 nm, (it can be replaced with hydrated nickel oxide), an electrically conductive layer made of ITO, of 200 nm.

The system is made to function by applying a potential of −1.6 v to apply the colouring and of +0.6 V for causing the system to fade.

Alternatively, what is involved is an electrochromic system referred to below by the term of system "B", which employs an electrolyte in the form of a polymer and in which the stacking of the functional layers is the following: (stacking in accordance with the teaching of patent EP-0 628 849):

a first electrically conductive layer made of $SnO_2$:F, of 300 nm, a first layer of anodic electrochromic material made of hydrated iridium oxide, of 55 nm, (it could be replaced with a layer of hydrated nickel oxide), a layer of hydrated tantalum oxide $Ta_2O_5 \cdot H_x$, of 70 nm, functioning as protection, a layer of electrolyte made of solid solution of polyoxyethylene with phosphoric acid POE—$H_3PO_4$, of 100 micrometers, a second layer of cathodic electrochromic material based on tungsten oxide, of 350 nm, a second layer of SnO$_2$:F, of 300 nm.

It works in the same voltage range. Each of the systems "A" and "B" is connected to a voltage generator with the aid of current leads in the form of strips placed at the opposite ends of the two electrically conductive layers.

The two electrochromic systems as described make it possible to "scan" a range of light transmission values of approximately between 5 and 60%.

In the case where an attempt is made, where necessary, to attain a real hiding effect (which is the case with applications as back projection screen working in transmission, as mentioned above), much lower transmission values, lower than 0.1%, for example of the order of 0.01 to 0.05%, can be attained by significantly increasing the thickness of the insertion/deinsertion layers of the functional stacking. It is thus possible to "thicken" considerably the layer of cathodic electrochromic material of the WO$_3$ type to values of more than 500 nm and even of more than 1000 nm, for example in thicknesses of between 500 and 1500 nm.

It is also possible to thicken the layer of anodic electrochromic material, for example to employ a layer of hydrated iridium oxide of more than 100 nm and even of more than 200 nm, especially in thicknesses of 100 to 300 nm.

Thus, if a system of "B" type is employed with a 1000 nm layer of WO$_3$ and a 200 nm layer of H$_x$IrO$_y$, a T$_L$ of approximately 0.01% in the coloured state can be obtained. On the other hand, in the faded state, the maximum light transmissions which can be obtained are then not very high, especially of the order of 20 to 30%.

EXAMPLE 1

This corresponds to the illustration of the unit given in FIG. 1: the glass substrate 1 is provided, on one of its faces, with the liquid-crystal system 2 through the intermediacy of an adhesive means 3, in the form of a sheet of double-faced adhesive which ensures the bonding by pressure (especially using a calendering-type operation). The electrochromic system 4 of "A" type is placed on the other face of the substrate by a succession of depositions using cathodic sputtering.

EXAMPLE 2

Figure 2:
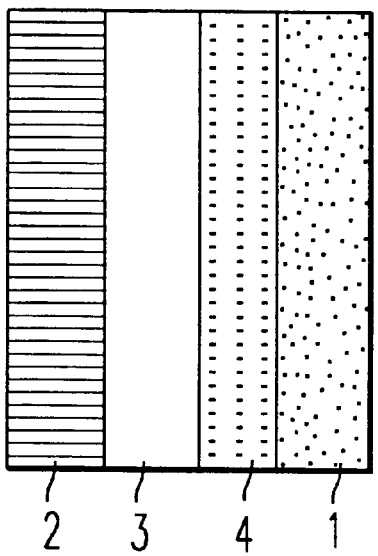

This corresponds to the illustration of FIG. 2: there is still only one glass substrate 1. This time the liquid-crystal system 2 is superposed on the electrochromic system "A" 4, still through the intermediacy of a pressure-sensitive adhesive 3.

EXAMPLE 3

Figure 3:
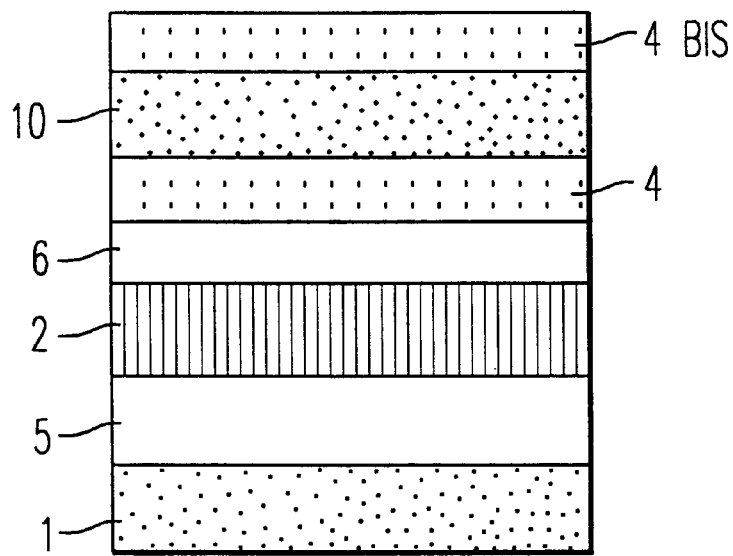
FIG. 3: an illustration of a unit according to the invention employing two rigid substrates.

This corresponds to the illustration of FIG. 3: there are two glass substrates 1, 10, between which the liquid-crystal system 2 is placed, arranged between two sheets 5, 6 of PVB, of EVA or of PU, of 0.76 mm thickness. The electrochromic system of "A" type is placed either between one of the PVB sheets 6 and the glass substrate 10, or on the external face of the substrate 10. For greater clarity, the two configurations have been shown under references 4 and 4 bis.

EXAMPLE 4

Figure 4:
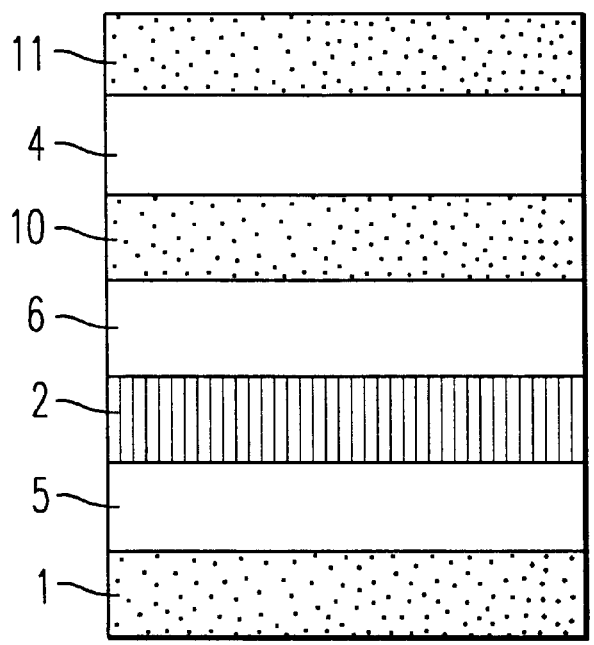
FIG. 4: an illustration of a unit according to the invention employing three rigid substrates.

This corresponds to the illustration of FIG. 4: this time the unit according to the invention includes 3 glass substrates 1, 10, 11. Between the substrate 1 and the substrate 10 the liquid-crystal system 2 is placed between two PVB sheets 5, 6 of 0.76 mm thickness. Between the substrate 10 and the substrate 11 is placed the electrochromic system of "B" type 4. It can be seen that, especially in this configuration, if it is envisaged to employ the unit as outward-facing glazing, the electrochromic system 4 preferably faces inwards: it is then protected from certain radiations emitted by the sun which can affect its durability, especially the ultraviolet radiations, by virtue of the interposition of the PVB sheets 5, 6, in which a UV screening agent is advantageously incorporated.

Figure 5:
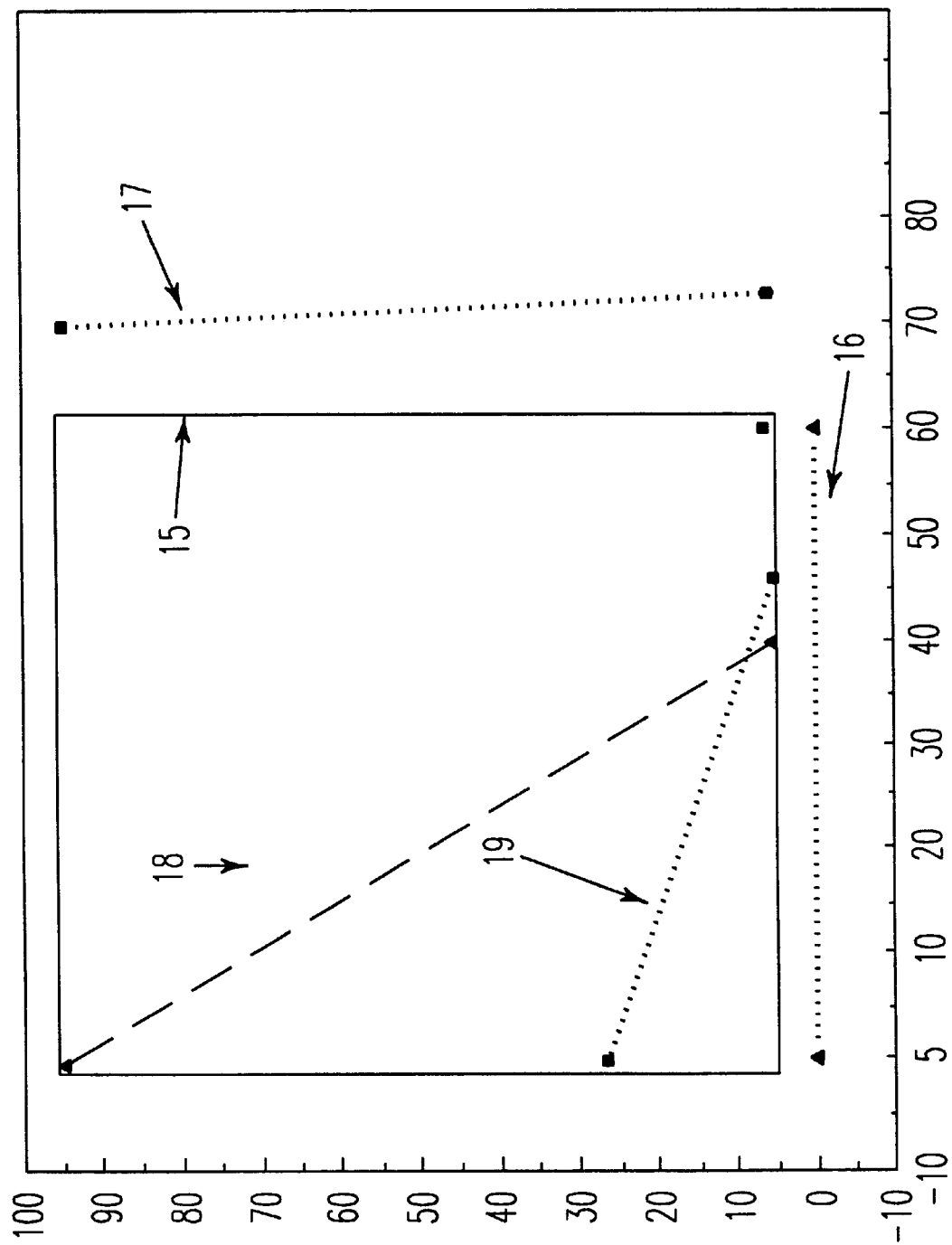
FIG. 5: a graph comparing the values of $T_L$ and of the turbidity.

FIG. 5 shows a graph produced with the aid of the results obtained from Example 4. In this FIG. 5, in fact, the values of turbidity have been plotted as the ordinate (the turbidity, expressed as a percentage, is the ratio of the diffused transmission to the light transmission at 560 nm), as a function of the values of light transmission as the abscissa (expressed as a percentage according to the illuminant D$_{65}$) which are accessible with the glazing of Example 4 and represented by all the points situated within the rectangle 15 (edges included).

The glazing according to the invention can thus combine the low T$_L$ values associated with high turbidities, which corresponds to the left upper quadrant of the frame 15 bounding the region in which the glazing can, for example, fulfil a function of a window shutter.

In the region bounded by the right upper quadrant the glazing has a high T$_L$ and a high turbidity, and it can then also fulfil a "concealment" function.

A low turbidity combined with a low T$_L$ makes it possible to have a glazing permitting vision while limiting the heating-up of a room or of a compartment in the case of strong sunshine. A high turbidity combined with a variable T$_L$ makes it possible to have a glazing which can be employed as a diffusing back projection screen which is adaptable as a function of the ambient lighting in order to optimize the image quality.

By way of comparison, these same values of turbidity have been plotted as a function of the T$_L$ for other types of "intelligent" glazing:

the straight-line segment 16 is obtained for a laminated electrochromic glazing of the type:
glass/electrochromic system "B"/glass/PVB/glass.

It does not actually "start up" completely at 0% T$_L$ but at 5% in the most coloured state, and scans a T$_L$ range of up to 60% in the maximum faded state. On the other hand, the glazing is nondiffusing, regardless of the state of its colouring.

The straight-line segment 17 is obtained in the case of a so-called liquid-crystal laminated glazing such as that marketed under the name of "Priva-Lite" by Saint-Gobain Vitrage: the turbidity of such a glazing can vary between approximately 6% of the values higher than 95%. on the other hand, the variations in T$_L$ are minimal, the T$_L$ value remaining at values close to 70%, to within 3 or 4%.

The straight-line segment 18 is employed for a laminated glazing with liquid crystals of "Priva-Lite" type, in which has been incorporated 2% of a mixture of black dichroic dyes, the concentration being based on mass relative to the liquid crystals. There is a complete interdependence in the changes in T$_L$ and in turbidity.

The straight-line segment 19 is obtained in the case of a glazing with an optical valve system based on dichroic particles described in patent WO-93/09460, more particularly in its Example 1. Here again there is a clear interdependence in the changes in T$_L$ and in turbidity, which are moreover confined to relatively narrow ranges.

It should be noted, furthermore, that the axes of the graph include negative values, which, of course, has no physical reality, but which makes the graph easier to read.

The following conclusions can be drawn from the description of these examples:

the unit according to the invention can assume very varied configurations, depending, for example, on whether compactness (Examples 1 or 2) or robustness (Example 4) is given priority, when a liquid-crystal system is chosen which is clamped between two PVB sheets, themselves clamped between two glass substrates, a laminated glazing is formed (Examples 3 or 4), from the comparison made in FIG. 5 it can be confirmed that only one unit according to the invention makes it possible to obtain the changes in turbidity and in $T_L$ in a decorrelated manner, and especially to obtain $T_L$/turbidity "pairs" which are inaccessible with the currently available "intelligent" glazings.

The priority document of the present application, French Patent Application No. FR 96/08591, is hereby incorporated by reference.

We claim:

1. Unit with variable optical properties, comprising at least one electrochromic or viologen type system, and at least one optical valve or liquid crystal system, said systems being electrically control-driven in order to modulate in an independent manner the light transmission level and the light diffusion level of said unit, wherein said optical valve or liquid crystal system is not transparent when no voltage is applied.

2. Unit according to claim 1, characterized in that the system with variable light transmission/absorption (4) is an electrochromic system comprising a stack of functional layers including an electrically conductive layer, a cathodic electrochromic layer capable of reversibly inserting cations such as $H^+$, $Li^+$, $Na^+$, and $Ag^+$, a layer of electrolyte, optionally an anodic second electrochromic layer capable of also reversibly inserting cations and second electrically conductive layer.

3. Unit according to claim 1, characterized in that the system with variable light transmission/absorption (4) is an electrochromic system including a stack of functional layers, including an electrolyte material in the form of an aqueous or anhydrous liquid or in the form of polymer(a) or of gel(s).

4. Unit according to claim 1, characterized in that the system with variable light transmission/absorption (4) is an electrochromic system including a stack of functional layers, including an electrolyte layer in the form of a solid material, based on metal oxide, the electrochromic system containing only layers of solid material.

5. Unit according to claim 1, characterized in that the system with variable transmission/absorption (4) is an electrochromic system including a stack of functional layers which are placed between two transparent rigid substrates (1, 10—10, 11).

6. Unit according to claim 1, characterized in that the system with variable transmission/absorption (4) is an electrochromic system including a stack of functional layers which are deposited on a single transparent rigid substrate (1).

7. Unit according to claim 1, characterized in that the system with variable light diffusion (2) is a system with an optical valve or with liquid crystals, including a film of polymer in which are embedded beads of liquid crystals, with the ordinary index of the crystals $n_o$ equal to the index of the polymer $n_p$ and placed between two electrically conductive layers.

8. Unit according to claim 7, characterized in that the film of polymer of the optical valve type or with liquid crystals between the two electrically conductive layers is provided on at least one of its faces, on each of its faces, with a carrier substrate which is transparent and rigid or semirigid.

9. Unit according to claim 8, characterized in that the combination comprising the film of polymer of the optical valve type or with liquid crystals, its electrically conductive layers and its carrier substrate(s) are laminated to at least one transparent rigid substrate of the glass type with the aid of at least one layer of organic polymer.

10. Unit according to claim 1, characterized in that the system with variable light transmission/absorption (4) and the system with variable light diffusion (2) are kept integrally together, but at a distance from one another.

11. Unit according to claim 1, characterized in that it comprises a rigid substrate (1), of the glass substrate type, provided on one of its faces with an tall solid electrochromic system (4) comprising a stacking of functional layers made of solid material and provided on its opposite face, or superposed on the electrochromic system, with a system with liquid crystals (2).

12. Unit according to claim 1, characterized in that it comprises two rigid substrates of the glass substrate type (1, 10), between which an all solid electrochromic system and a system with liquid crystals are placed.

13. Unit according to claim 1, characterized in that it comprises two rigid substrates of the glass substrate type (1, 10) with an electrochromic system (4) placed between the two substrates and a system with liquid crystals (2) which is placed on the external face of one of the two substrates, or a system with liquid crystals which is placed between the two substrates and an all-solid electrochromic system placed on the external face of one of the two substrates.

14. Unit according to claim 1, characterized in that it comprises three rigid substrates of the glass substrate type (1, 10, 11) with an electrochromic system (4) placed between the first and the second substrate (10, 11) and a system with liquid crystals (2) placed between the second and the third substrate (1, 10).

15. Unit according to claim 1, characterized in that the system with variable light diffusion (2) is a system with liquid crystals which is made to adhere to a rigid substrate of the glass type (1, 10) or to the electrochromic system with variable light transmission/absorption (4) with the aid of an adhesive, of a pressure-sensitive adhesive or of a sheet or of a PVB, PU or EVA organic polymer (5, 6) for assembly.

16. Unit according to claim 1, characterized in that it is fitted as laminated glazing and/or as multiple glazing with intermediate gas sheet(s).

17. Process for operating the unit according to claim 1, characterized in that the supply of electricity to the system with variable light transmission/absorption (4) and that to the system with variable light diffusion (2) are controlled jointly, to obtain the desired light transmission and diffusion levels using manual control or using automation.

18. Process according to claim 17, characterized in that the supply of electricity to the system with variable light transmission/absorption (4) and/or the supply of electricity to the system with variable light diffusion (2) is (are) performed using automated control with the aid of electronic and/or data-processing means according to an instruction which is preestablished or servo-controlled by the measurement of a parameter given by suitable sensors, for the measurement of temperature, of lighting, of light transmission or of solar flux.

19. A building comprising a unit, wherein said unit is a unit with variable optical properties, comprising at least one electrochromic or viologen type system, and at least one optical valve or liquid crystal system, said systems being electrically control-driven in order to modulate in an independent manner the light transmission level and the light diffusion level of said unit, wherein said optical valve or liquid crystal system is not transparent when no voltage is applied.

20. The building of claim 19, wherein said unit is an external glazing or a glazing for an internal partition or glazed door.

21. The building of claim 19, wherein the unit is a "sun-break" glazing which may be inclined.

22. A vehicle, comprising a unit, wherein said unit is a unit with variable optical properties, comprising at least one electrochromic or viologen type system, and at least one optical valve or liquid crystal system, said systems being electrically control-driven in order to modulate in an independent manner the light transmission level and the light diffusion level of said unit, wherein said optical valve or liquid crystal system is not transparent when no voltage is applied, and said vehicle is selected from the group consisting of a motor vehicle, an industrial or public transport vehicle, a train, and an aircraft.

23. The vehicle of claim 22, wherein said unit is an external glazing or a glazing for an internal partition or glazed door.

* * * * *